United States Patent Office.

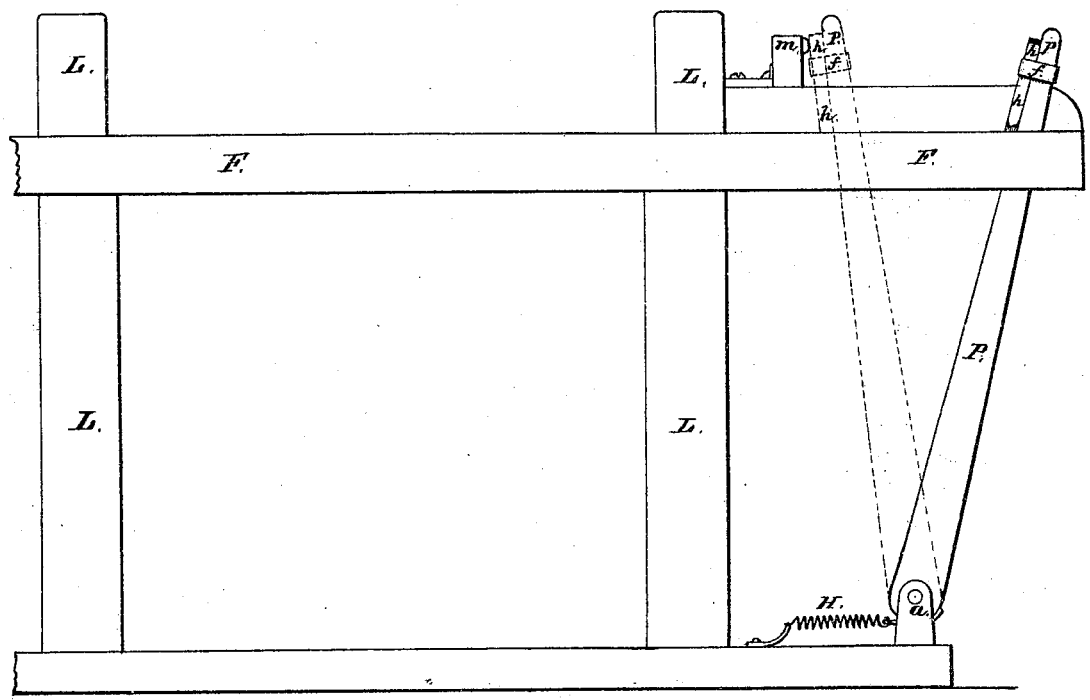

ALBERT STOCKWELL, OF PROVIDENCE, RHODE ISLAND.

Letters Patent No. 90,888, dated June 1, 1869.

IMPROVEMENT IN LOOM.

The Schedule referred to in these Letters Patent and making part of the same.

*To all whom it may concern:*

Be it known that I, ALBERT STOCKWELL, of the city and county of Providence, and State of Rhode Island, have invented a new and useful Improvement in Power-Looms; and I do hereby declare that the following is a full, clear, and exact description of the same, reference being had to the accompanying drawings, making part of this specification, in which—

Figure 1 represents a front view of the lathe of a power-loom arranged with my improvement.

The object of my invention is to prevent the picker that is used on the picker-stick or wag-staff of a loom from becoming detached from the stick, which is occasioned by the sudden percussion and rebounding of the stick, when, at the end of its forward movement, it strikes the ordinary arresting-device; and to this end My invention consists in the employment of a buffer, secured above the lathe-beam of the loom, and so arranged with relation to the picker, that at the termination of the forward stroke of the stick, the buffer will come in contact with or directly receive the stroke of the picker at or near the upper end of the latter.

The picker-stick or wag-staff P is pivoted at A, and is forcibly thrown by mechanism from the position shown to that shown in dotted lines in the drawing, for the purpose of throwing the shuttle by its upper end across the warp, which passes between the swords L L of the lathe, the said stick or staff being returned to its first position, preparatory to a repetition of its stroke, by the spring H, or similar means.

The upper end of the picker-stick P swings in a slot cut in the lathe-beam F; and heretofore it has been the practice to arrest the movement of the picker-stick by allowing it to strike against the forward end of this slot, which sustained the force of the blow. But as the picker is secured to the picker-stick above the said lathe-beam F, it (the picker) is liable to be, and frequently is detached from the picker-stick by the force of the blow, and is thrown so forcibly against the warps as to break them.

To avoid this and other difficulties growing out of the usual method of arresting the force of the picker-stick, I employ a bunter or buffer, $m$, consisting of a pad of leather held in a socket of cast-iron, or other suitable material, and secured by screws or otherwise on the lathe in such a position as to receive the stroke of the picker at or near the upper end of the latter, so that the force of this loaded, swinging end of the picker-stick is received and deadened by its concussion with the buffer.

As shown in the drawings, the picker $h$ is secured by the collar $f$ (generally of leather) to the end of the picker-stick, with the upper end of the picker extending upward nearly to the end of said stick, and the buffer $m$ is secured sufficiently above the lathe-beam F for the upper end of the picker, at the extreme end of the picker-stick, to strike against it, as shown in dotted lines, by which arrangement, since both picker and picker-stick move together, they are arrested together, the picker or detachable piece, first and foremost, coming directly in contact with the buffer, and in such a manner as to relieve the collar $f$ of any strain and the end of the stick from any liability of breaking off, as not unfrequently occurs from the concussion and rebounding of the end of the stick when it is allowed to strike, and is arrested by the forward end of the slot in the lathe-beam, or any device that is placed within or upon the same, as above mentioned. So that, although the stick may be arrested by the use of the ordinary arrester in the lathe-beam—which can be done if it should be preferred to have the stick itself strike directly against the arresting-device—the buffer $m$, whose location is unchanged, will still act to prevent the loosening and detaching of the picker. The buffer alone will answer, however, both purposes, its direct contact with the picker not only serving to arrest the movement of the stick, but also securing the important advantage of preventing the detachment of the picker, as before explained.

I do not desire to claim arresting the picker-stick, as that has been done before in various ways.

What I do claim, and desire to secure by Letters Patent, is—

The buffer $m$, or its equivalent, secured above the lathe-beam, to receive the stroke of the picker $h$ at or near the upper end of said picker, substantially as described, for the purpose specified.

ALBERT STOCKWELL.

Witnesses:
ISAAC A. BROWNELL,
WILLIAM BROWNELL.